US00RE50461E

(19) United States
(12) Reissued Patent
Prescott

(10) Patent Number: US RE50,461 E
(45) Date of Reissued Patent: Jun. 24, 2025

(54) PRESSURIZED GROWING AIR SYSTEM FOR VERTICAL AND HORIZONTAL PLANTING SYSTEMS

(71) Applicant: Air8Green, LLC, Tracys Landing, MD (US)

(72) Inventor: Mark R. Prescott, Stephentown, NY (US)

(73) Assignee: Air8Green, LLC, Tracys Landing, MD (US)

(21) Appl. No.: 16/287,701

(22) Filed: Feb. 27, 2019

Related U.S. Patent Documents

Reissue of:
(64) Patent No.: 9,578,819
Issued: Feb. 28, 2017
Appl. No.: 14/163,660
Filed: Jan. 24, 2014

U.S. Applications:
(60) Provisional application No. 61/849,339, filed on Jan. 24, 2013.

(51) Int. Cl.
*A01G 27/04* (2006.01)
*A01G 27/06* (2006.01)

(52) U.S. Cl.
CPC ..... *A01G 27/04* (2013.01); *A01G 27/06* (2013.01)

(58) Field of Classification Search
CPC ..... A01G 27/04; A01G 27/06
USPC ..... 47/79, 81, 82, 83, 86
See application file for complete search history.

(56) References Cited

U.S. PATENT DOCUMENTS 3,714,392 A * 1/1973 Katzman et al. ..... F24H 1/00 128/203.17
4,295,296 A * 10/1981 Kinghorn ..... A01G 9/025 47/82
4,305,226 A * 12/1981 Brown ..... A01G 27/04 47/81
4,380,136 A * 4/1983 Karpisek ..... A01G 9/023 47/39
4,447,983 A * 5/1984 Shinada ..... A01G 27/005 47/48.5

(Continued)

FOREIGN PATENT DOCUMENTS

WO WO 2012/129522 * 9/2012 ..... A01G 9/02

*Primary Examiner* — Russell D Stormer
(74) *Attorney, Agent, or Firm* — Fish & Richardson P.C.

(57) ABSTRACT

A Growing apparatus for cleansing air and watering plant, wherein the apparatus includes a modular panel constructed for either vertical or horizontal planting systems, including connecting couplers and end caps for directing water flow from upper to lower [channels] *chambers*. Panel consist of 5 [channels] *chambers* per section with opposing conical top and bottom set at [45 degree] *45-degree* angles [(FIG. 9-23)] for both channeling water and accepting irrigation nozzle. System can also use a horizontal channel system while the orientation is different but function is the same. Panels stack nesting consecutively on top of each other to make larger systems.

20 Claims, 9 Drawing Sheets

AMENDED

(56) References Cited

U.S. PATENT DOCUMENTS 4,619,072 A * 10/1986 Privett ..... A01G 27/001 137/209
4,676,023 A * 6/1987 Mori ..... A01G 31/06 47/48.5
4,864,771 A * 9/1989 Fah ..... A01G 27/06 47/79
4,951,416 A * 8/1990 Gutridge ..... A01G 31/02 47/39
5,046,282 A * 9/1991 Whitaker ..... A01G 27/003 47/79
5,367,823 A * 11/1994 Ferris ..... A47G 7/041 47/39
5,382,410 A * 1/1995 Peltier ..... A61L 9/127 239/34
5,916,493 A * 6/1999 Miller ..... A61M 16/1075 128/204.13
6,499,249 B1 * 12/2002 Luijkx ..... A47F 7/0078 206/423
7,499,632 B2 * 3/2009 Granger ..... A01M 1/2033 392/386
7,775,459 B2 * 8/2010 Martens, III ..... B05B 17/0684 128/200.14
8,505,238 B2 * 8/2013 Luebbers ..... A01G 31/02 47/62 A
8,683,744 B2 * 4/2014 Chang ..... A01G 9/027 47/41.01
8,833,366 B2 * 9/2014 Colombo ..... A01M 1/2033 128/200.14
9,222,719 B2 * 12/2015 Bortoletto ..... F25D 17/042
2007/0209279 A1 * 9/2007 Pasquariello ..... A01G 27/06 47/81
2009/0151246 A1 * 6/2009 Watson ..... A01G 27/005 47/79
2009/0223126 A1 * 9/2009 Garner ..... E04F 13/081 47/66.7
2010/0146855 A1 * 6/2010 Ma ..... A01G 9/025 47/82
2012/0227320 A1 * 9/2012 Dos Santos ..... A01G 9/025 47/79
2012/0279120 A1 * 11/2012 Prescott ..... A01G 27/003 47/48.5
2013/0152467 A1 * 6/2013 Chang ..... A01G 9/025 47/82
2013/0340337 A1 * 12/2013 Kuo ..... A01G 9/023 47/82
2014/0115963 A1 * 5/2014 Sung ..... A01G 9/025 47/82
2015/0096229 A1 * 4/2015 Chang ..... A01G 27/005 47/82
2015/0230412 A1 * 8/2015 Ito ..... A01G 27/005 47/66.7
2016/0113211 A1 * 4/2016 MacKenzie ..... A01G 9/025 47/79

* cited by examiner

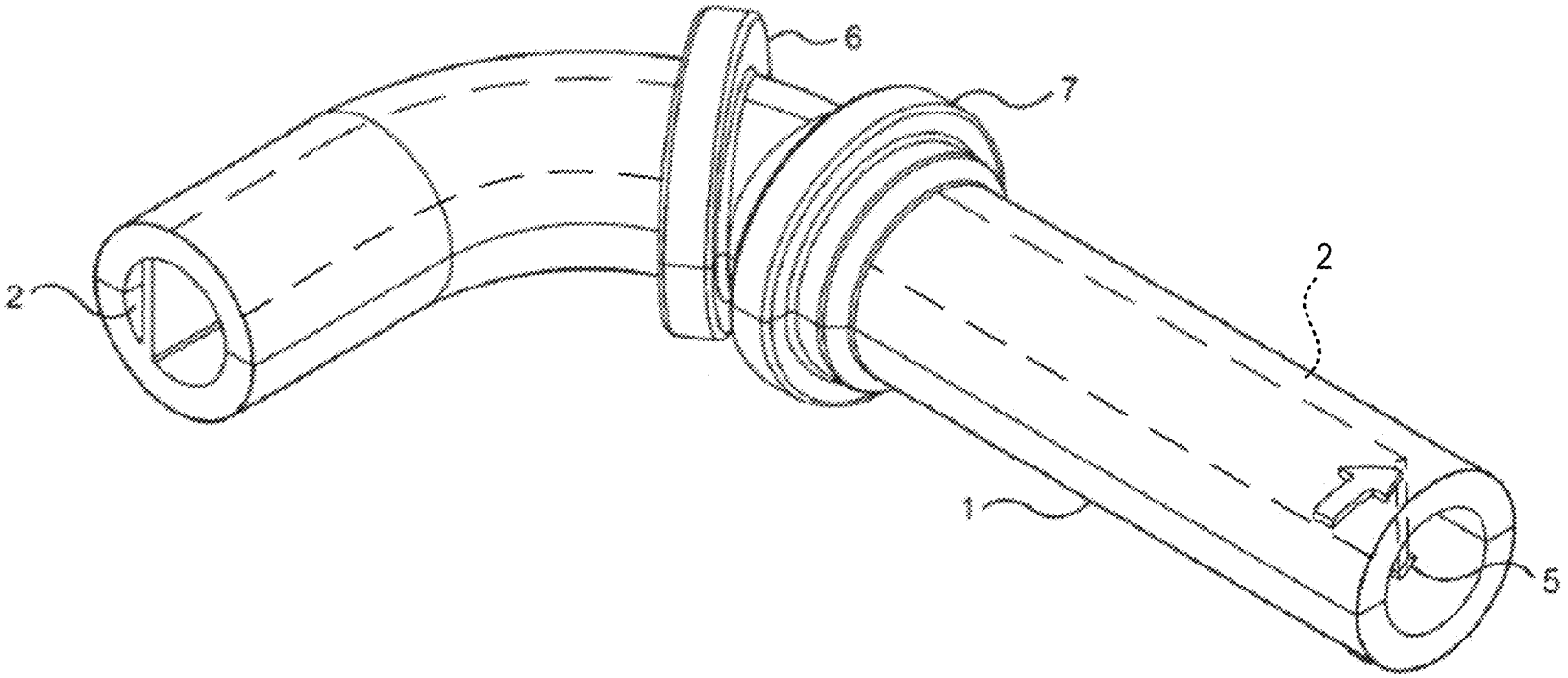
Fig. 1
AMENDED

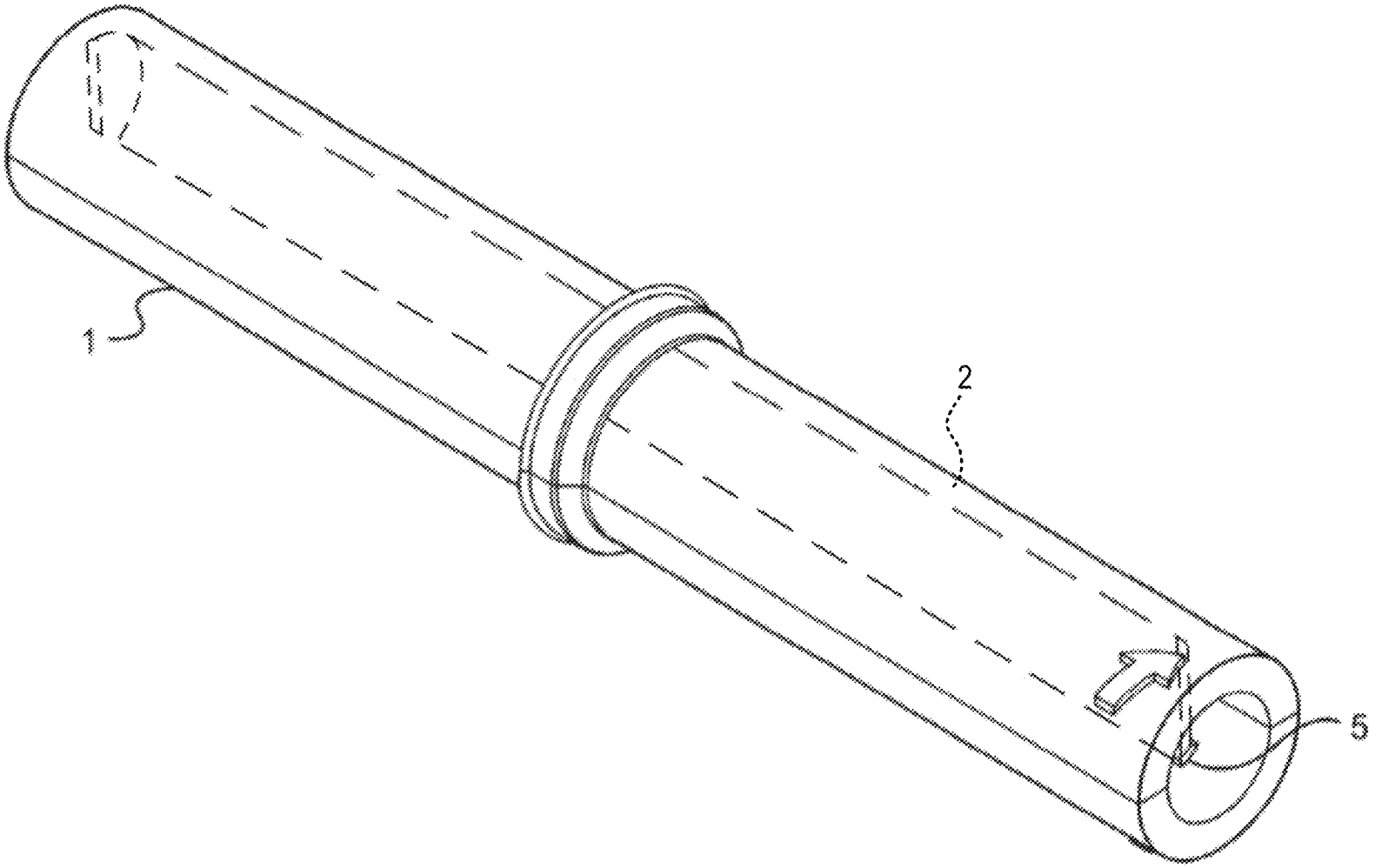
Fig. 2
AMENDED

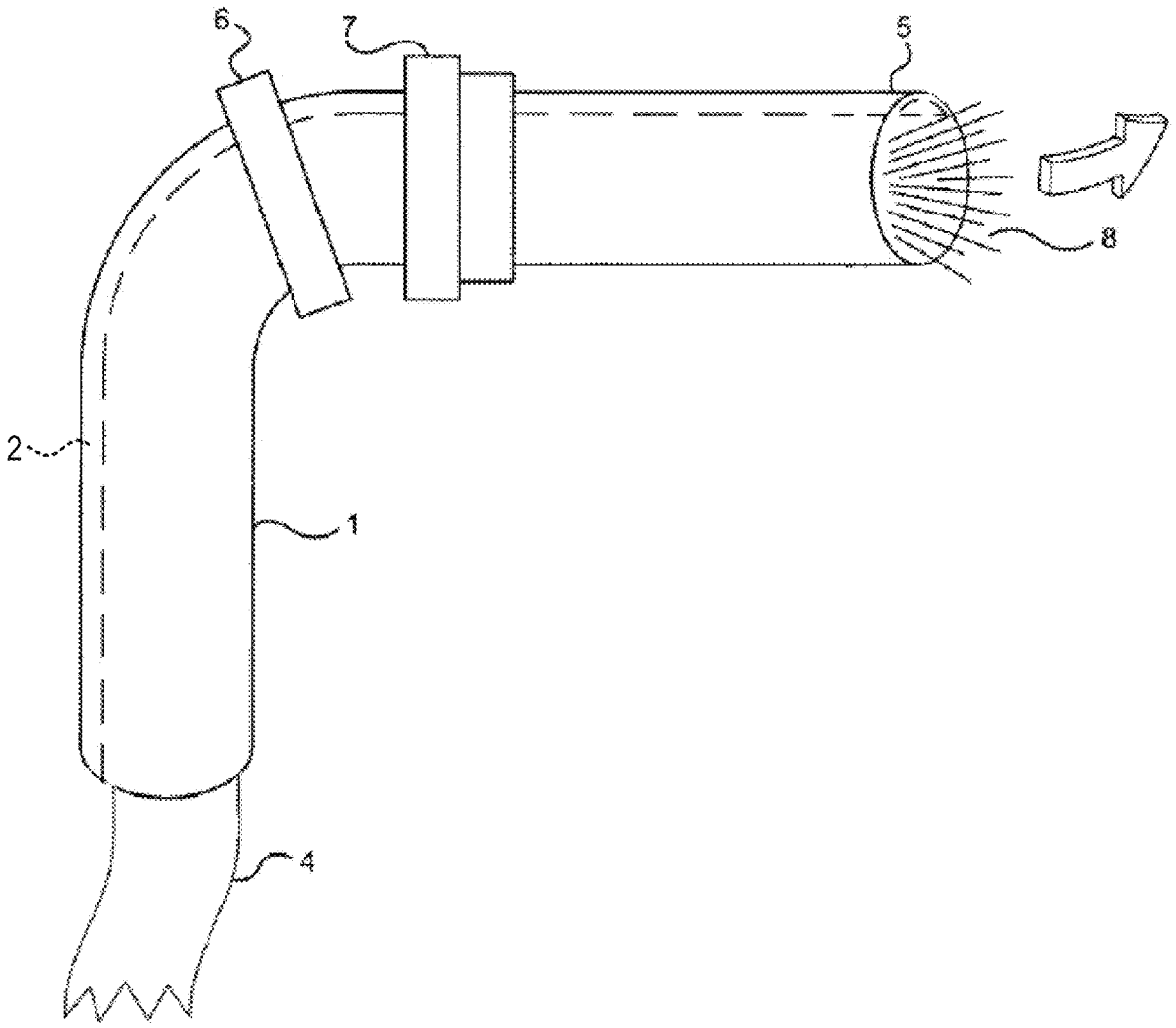
Fig. 3
AMENDED

AMENDED

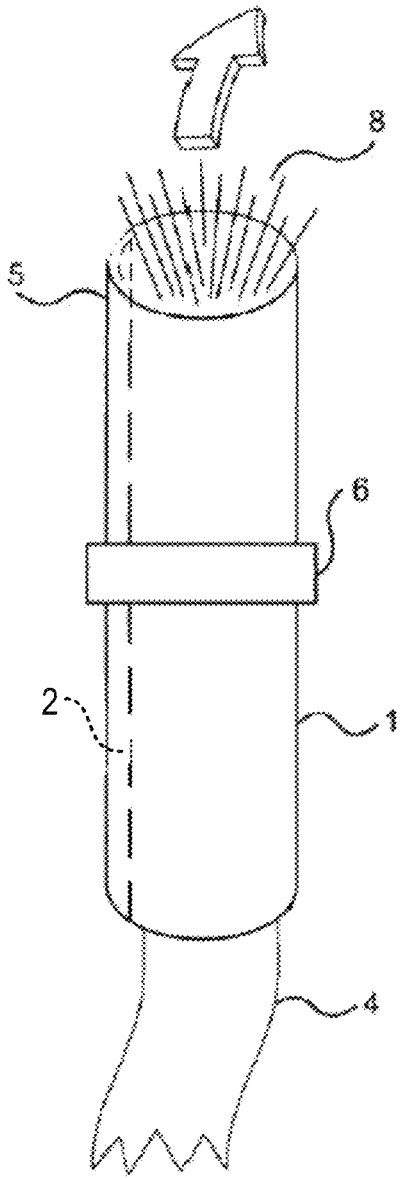
Fig. 5
AMENDED

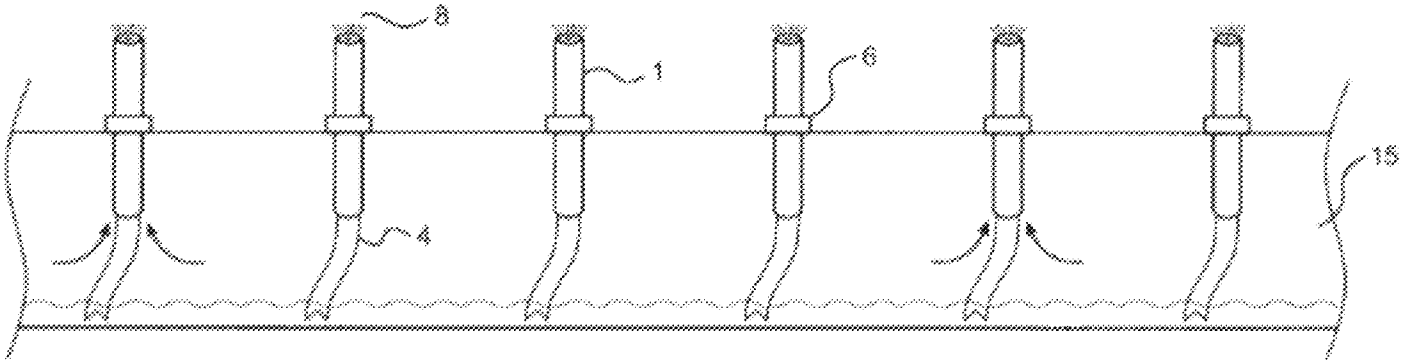
Fig. 6
AMENDED

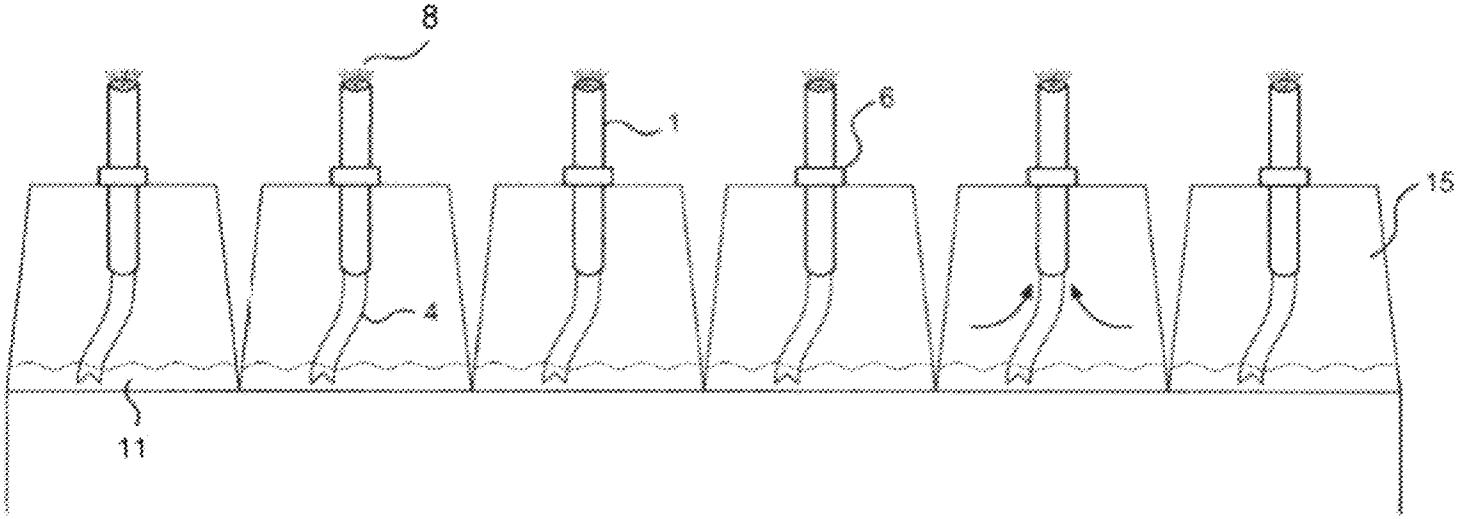
Fig. 7
AMENDED

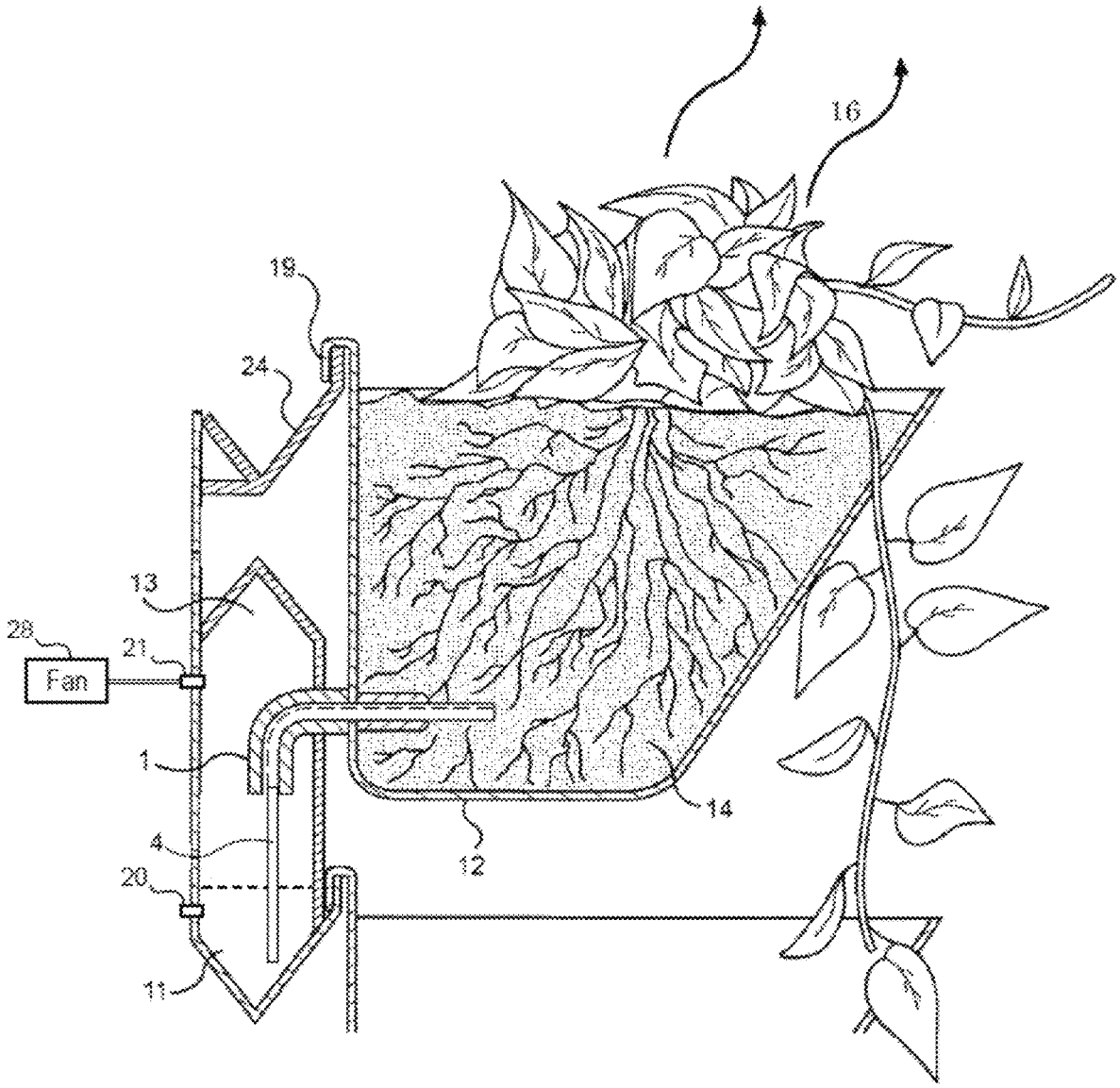
Fig. 8
AMENDED

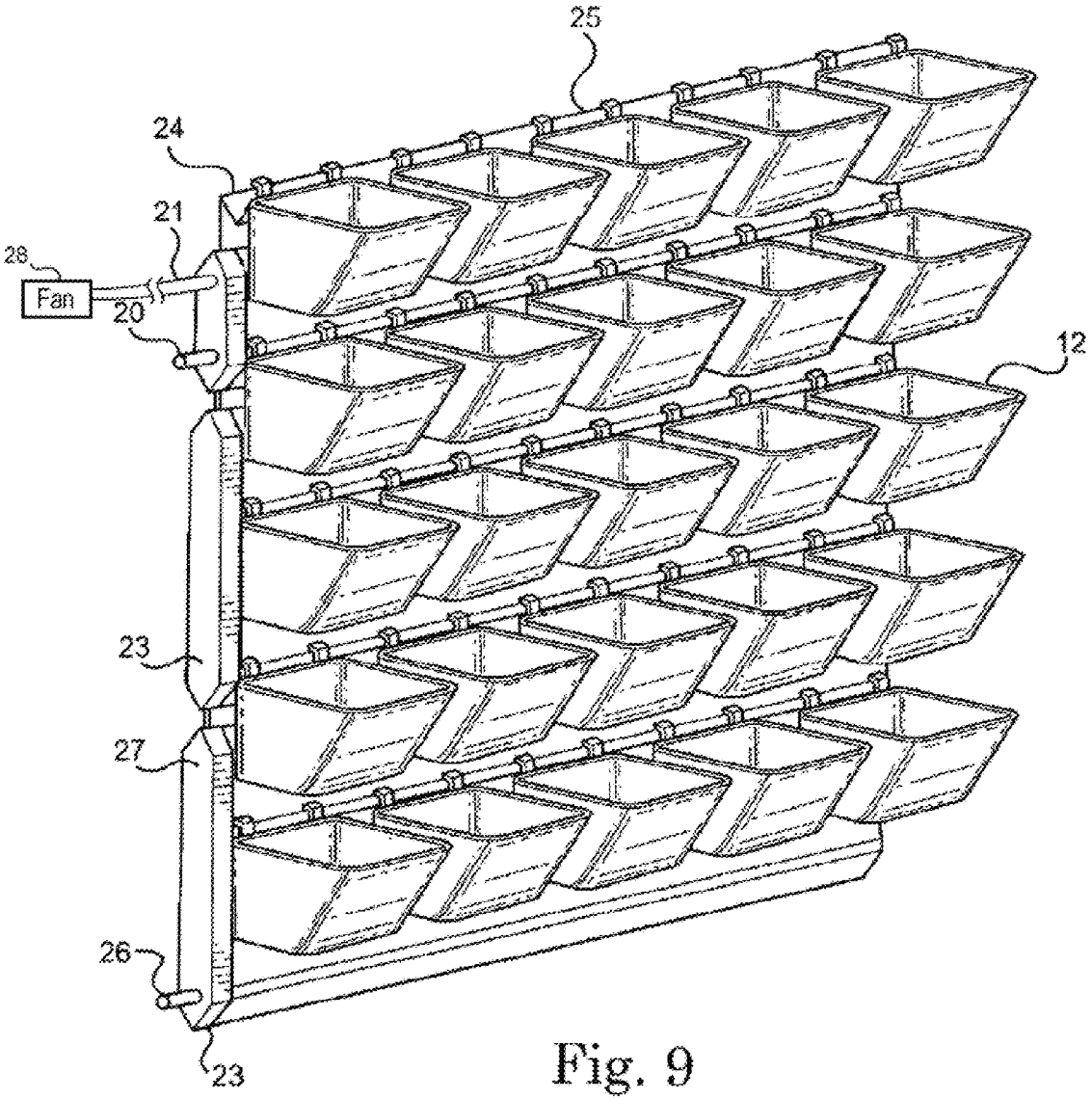
Fig. 9
AMENDED

PRESSURIZED GROWING AIR SYSTEM FOR VERTICAL AND HORIZONTAL PLANTING SYSTEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE

This application *is a reissue application of U.S. patent application Ser. No. 14/163,660, filed Jan. 24, 2014, now U.S. Pat. No. 9,578,819, issued Feb. 28, 2017, which* claims priority [of which are incorporated herein by reference (1) provisional application] *from U.S. Provisional Patent Application* No. 61/849,339*, which is incorporated by reference in its entirety.*

BACKGROUND

Indoor green walls using plants have been increasingly popular for aesthetics, improved air quality, humidity and natural cooling. Planting system both horizontal and vertical systems have been developed for air cleaning using the microbes living around plant roots for air cleaning. These green structures can pose a number of problems for the owner, mold, algae, and health issues from dirty catch basin reservoir. Drip irrigation or ["eb] flow systems are the most common methods of irrigation for vertical systems. Because each plant tray drains into the next consecutive tray all the dirt/debris flows into catch basin that is open and exposed to the indoor environment. Poor air circulation creates mold and algae problems, and poor growing conditions for the plants. The [plants] *plant's* ability to clean the air is inhibited by these issues and dramatically reduces the [potential] *potentially* healthy effects green walls can have. Aeroponic systems like U.S. Pat. No. [850,523B2] *8,505,238 to* Luebbers, Hensley, use spray methods for watering plants still resulting in a mixture of soil and debris in irrigation water which will frequently need to be cleaned. Drip vertical systems like patent [#EP1416229A2] *EP1416229A2 to* Darlington, use an air permeable [sub-straight] *substrate* creating a similar problem of organic/dirt debris building up in containment reservoir. EP2654400A 1 *to* Paleszezak, discloses a series of pipes, with alternating prismatic shaped bins, for air circulation. [W02011 019277 A2] *WO2011019277A2 to* Kluiver, discloses a system where indoor pollution is captured on the leaves of a plant and washed into substrate. [System W0201 0033423A 1] *WO 2010/033423A1 to* Wolverton/Middlemark, use beds with various sized substrate to and drip irrigation to process indoor air through. U.S. Pat. No. [6,477,80582] *6,477,805B2 to* Ware, uses similar drip methods, again mixing irrigation water directly with planting mediums and debris. Therefore, it is the purpose of this invention to demonstrate an irrigation system that efficiently delivers water and air directly into planting substrate that does not need modification for air flow, while keeping irrigation water separate from living area. It is the purpose of this invention to use air movement to facilitate water movement over a modified wicking system into the soil, not using the capillary nature of the wick to do so as U.S. Pat. No. 4,741,125 *to* Donald Pengorest, where [a bi] *an* expandable metal control device is used for control. Further, U.S. Pat. No. 4,219,967 *to* Hickerson, relies on a wick system as well. Capillary wicks are used in many growing devices however controlling the moister they deliver is not easily achieved, leaving soil saturated and unhealthy. There for it is the purpose of this invention to control air and moisture delivery through a specifically designed nozzle that removes the need for electronic equipment for regulating moisture levels.

SUMMARY

The System Pressurized vertical-horizontal growing system solves a number of problems that convention irrigation systems have as well as growing systems for the purpose of [Phytoremediation. Including] *phytoremediation, including* the elimination of water catch basins, electronically monitoring equipment, or the need for specially modified planting mediums. This system while using a capillary wick does not require capillary "action" from the wick for moisture movement, but relies on air movement to create a ["negative"] *negative* air pressure *build up* for drawing water into the soil substrate. This process created by the air channel location within the wick is [self regulating] *self-regulating*. [Whereas the more] *Greater* air flow moving through the system [the] *causes* more water movement, thus creating a balance with the water to air ratio [insuring] *ensuring* healthy roots and plants without relying on electronic equipment. It is also a benefit of the process to create a microclimate and moisture rich area around the plant grown, this is accomplished by the movement of air "pushing" through the soil. In addition, our air flow rates are more favorable to total filtration per pass of air due to slower rates. In addition, air filtration can be targeted to specific areas where air remediation is needed.

BRIEF DESCRIPTION OF DRAWINGS

FIG. 1 [Shows] *shows a curved* nozzle [for vertical system (1) and nozzle with collar (6) for positioning nozzle in the correct depth. (2) shows air channel for moving air through (1) nozzle. Pot collar (7) holds pot the proper distance from channel. Recessed air channel (5) ends ⅛-¼ inch from nozzle opening to insure negative pressure build up in nozzle (1,2)].

FIG. 2 [Shows] *shows* a straight nozzle [(1) for horizontal growing channels with air channel (2) and (5) recessed air chamber].

FIG. 3 [Demonstrates the] *shows a curved* nozzle [(1)] with *a* fiberglass wick [(4) inserted and (8) air flow out of tube from channel. FIG. 8 (9, 13) to see channel. (5) shows recess in air chamber to create the negative pressure on the wick for water movement].

FIG. 5 [Demonstrates] *shows* a straight nozzle [(1)] for *a* horizontal [applications with which (4) nozzle stop (6) and air flow out of nozzle (8)] *growing system.*

FIG. 6 [Is] *is* a side view of [horizontal panel (15) showing nozzles (1) seated into channel with which (4) hanging in irrigation water (17) irrigation water needs to be 2 inches from base of nozzle (1, 18) for process to work properly] *a channel of a horizontal growing system.*

FIG. 7 [Is] *is* a front [cut away] look at [a horizontal channel (15) showing irrigation water (17) and distance between irrigation water and nozzle base (28)] *multiple adjacent channels of a horizontal growing system.*

FIG. 8 [Shows] *is* a cross section [of air channel (9) with] *view of a system that includes a* planting pot [(12) pot is hanging on rail (19) and seated into nozzle (1) wick (4) is hanging in irrigation water (11) with the two inch space (28) between the bottom of nozzle (1) and irrigation water (11) Air and moisture from channel (9) move into the soil with microbes (14) Clean remediated air leave planting pot (12) from top of pot bathing plant in humid air (16)].

FIG. 9 [depicts] *shows* the embodiment of *the system shown in* FIG. 8 [having] *that has* connected [chambers that contain] *channels containing* indoor air and a small reservoir of water.

DETAILED DESCRIPTION

Figure 4:
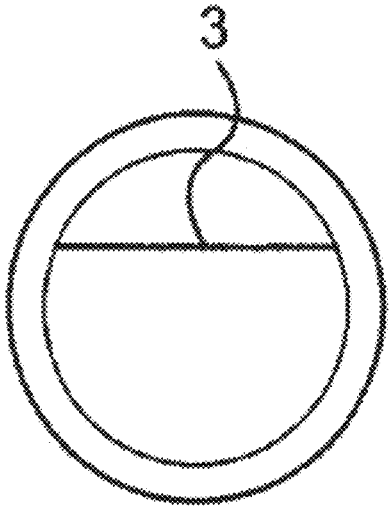
FIG. 4 [Is] *is* a front look at *an end of a* nozzle [(1) tube end (3) shows the air channel and nozzle end without the fiberglass wick].

Water/air delivery system for *a* vertical and horizontal plantings that enables water, air and heat (if needed) delivery through a single pressurized system in conjunction with a targeted delivery nozzle designed to efficiently combine air and water in tandem while keeping soil substrate adequately moist for plant and microbe growth. This system enables [High] *high* air volumes to be pumped through root zones enhancing the process of [Phytoremediation] *phytoremediation*. System is scalable for small consumer growing system and to large commercial applications. This system eliminates the need for separate water drainage/reservoir catch basins, electronic sensing or timers for watering. This system also conserves energy with targeted nozzles that deliver water, air and optional heat to each growth container. Nozzles can be removed from the system when not in use so no energy or water will be used. Nozzle uses absorptive wick but does not rely on capillary action for moving moisture, rather uses air flow targeted directly behind wick end to propel moisture into growing container soil medium from a ["negative"] *negative* pressure *build up* created within the nozzle. Thus, the purpose of this system is to adequately provide air and water to a *system* (*disclosed in* U.S. [provisional patent] *Provisional Patent Application No.* 61/849,339) *that* plants roots for air cleaning while keeping water for irrigating the system isolated from rooms interior.

*FIG. 1 shows a curved nozzle 1 for a vertical growing system. The nozzle 1 includes a collar 6 for positioning the nozzle 1 at a correct depth. The nozzle 1 includes an air channel 2 for moving air through the nozzle 1 body. A pot collar 7 holds pot at a proper distance from an air channel. The air channel 2 terminates at point 5, which is ⅛-¼ of an inch from a nozzle opening. This ensures a buildup of a negative pressure build up inside the nozzle.*

*FIG. 2 shows a straight nozzle 1 for a horizontal growing system. The nozzle 1 includes an air channel 2 that terminates at point 5.*

*FIG. 3 shows a curved nozzle 1 with a fiberglass wick 4 inserted into the nozzle 1. Air flow 8 includes air flowing out of the nozzle 1. Air channel 2 terminates at point 5. A negative pressure build up is inside the nozzle 1 to provide for water movement.*

*FIG. 4 is a front look at an end of a nozzle. A divider 3 creates two channels within the nozzle body. The two channels include an air channel 2 through which air moves through the nozzle body, and another channel through which air and water moves through the nozzle body.*

*FIG. 5 shows a straight nozzle 1 for a horizontal growing system. The nozzle 1 includes a collar 6 for positioning the nozzle 1 at a correct depth. The nozzle 1 includes a wick 4. Air flow 8 includes air flowing out of the nozzle 1.*

*FIG. 6 is a side view of a channel 15 of a horizontal growing system. Multiple nozzles 1 are seated into the channel 15 with corresponding wicks 4 hanging in irrigation water 11. Irrigation water 11 needs to be two inches from the base of each nozzle 1 for the irrigation process to work properly.*

*FIG. 7 is a front view of multiple adjacent channels 15 of a horizontal growing system*

*FIG. 8 is a cross section view of a system that includes a chamber 13 and a planting pot 12. The planting pot 12 hangs on a rail 19 and is seated into a portion of the nozzle 1 and the wick 4. The opposite end of the wick 4 hangs in irrigation water 11 with the two-inch distance between the bottom of the nozzle 1 and the irrigation water 11. Air and moisture is moved from chamber 13 to the soil substrate 14 in the planting pot 12 through the nozzle 1 and wick 4. Clean remediated air leave planting pot 12 from top of pot bathing plant in humid air 16.*

[This system embodies connected chambers (FIG. 9) that] *FIG. 9 shows the embodiment of FIG. 8 having connected channels that contain indoor air and a small reservoir of water. The embodiment shown in FIG. 9* contain indoor air and a small reservoir of *irrigation* water [17,] 11 that can either be fed continuously or intermittently with a pump or direct water feed using a solenoid and a timer. Nozzle 1 placement in the system is critical and needs to be set into the system so water does not mix with the nozzle 1 system. Only air enters the nozzle 1 which in turn creates a negative pressure *build up* via the recessed air channel which draws the water into the substrate.

The [Growing] *growing* apparatus may be for cleansing air and watering plant, wherein the apparatus includes a modular panel constructed for either vertical or horizontal planting systems, including connecting couplers [19] and end caps [20] for directing water flow from upper to lower channels 22. The panel consist of five (5) channels per section with opposing conical top and bottom set at [45 degree] *45-degree* angles 23 for both channeling water and accepting irrigation nozzle. Note, the system can also use a horizontal channel system as FIGS. 7 and 8 demonstrate, while the orientation is different, the function is the same. Panels 24 stack nesting consecutively on top of each other to make larger systems. Panels may have an attached rail 25 for accepting and hanging planting container.

The panels may have ports *20 and 21. Port 20 can be used for accepting water. Port 21 can be used* for accepting ["air" 21 and "water" 20] from an external fan *28* (or blower). [as well as] *Port 20 can be used for accepting water from a pump or direct water feed using a solenoid and a timer. The panels may also include* a drain 26 located at the bottom of the last run for draining the system. End connecting caps that extend upwards into bottom [of] channel 27 restricting and holding water in the base of the channel as well as the channel within the end cap for directing water flow to the bottom of next consecutive channel.

Air ports 21 [at the top of the air chambers 2] may be for the purpose of air direction forced in a downward flow to alleviate water and air "mixing" within the nozzle. The system may create separation of irrigation water [in channel] 11 from soil substrate [10] *14* by positive pressure within [said channel] *air chamber* 13 [insuring] *ensuring* no mixing of the irrigation water 11 and [planting medium 10] *soil substrate 14* occurs.

The system may use a [wicking system/nozzle] *nozzle* 1 *that is* spaced from a distance of 2-3 inches from the [water source] *irrigation water* 11 [to the base of the nozzle holding wick in center of channel] to [insure] *ensure* no mixing of water and air occur. The nozzle 1 may use a separate air [chamber] *channel* 2 for efficiently moving air out of [said]

chamber [28] *13* without extreme pressure build up. The system may utilize [said] *the* nozzle *1* and air [chamber] *channel* 2 that is recessed back ~~1~~;8~~1~~;4 inch to direct air volume over end of exposed wick *4* to facilitate water movement into soil rooting media [Wherein] without directed air movement over [said] wick moisture movement would not occur. The system may use air movement through [said] *the* air [chamber] *channel* 2 into [said] *the* nozzle *1* as a means for irrigating a plant.

What is claimed is:

1. A growing apparatus for cleansing air and watering plant comprising:

a modular panel having a rail, a plurality of channels, an air port and a water port, wherein each channel of the plurality of channels has an opposing conical top and bottom to channel water and accept a nozzle having a wick;

a connecting coupler and end cap configured to direct water flow from a first channel to a second channel wherein the end cap restricts and holds water within a base of the first channel and directs water flow to a bottom of the second channel; and

[an] *a* fan connected to the air port, wherein the fan provides an air flow [behind the wick and] *causing* a negative pressure [of the air flow within the nozzle] *build up in the nozzle that* propels the water flow through the wick.

2. The apparatus of claim 1, wherein the nozzle is spaced a distance of 2-3 inches above a source of the water and the wick is centered in each channel of the plurality of channels [to ensure no mixing of the source of water and air occur].

[3. The apparatus of claim 1, wherein the nozzle has a separate air chamber to move air out of said air chamber without a pressure build up.]

4. The apparatus of claim [3] *1*, wherein the [movement of air through the air chamber into] *water flow through* the nozzle irrigates a plant.

5. The apparatus of claim 1, wherein the nozzle directs a volume of air [over an end of the wick] *through the nozzle from each channel* to facilitate water movement into a soil rooting media.

[6. The apparatus of claim 1, wherein the air port forces air flow in a downward direction to alleviate a mix of water and air within the nozzle.]

[7. The apparatus of claim 1, wherein positive pressure within the plurality of channels creates separation of water in the first channel and the second channel from a soil substrate within the plurality of channels ensuring no mixing of the water and soil substrate.]

8. The apparatus of claim 1, wherein each section of the modular panel consists of five channels per section.

9. The apparatus of claim 1, wherein orientation of the plurality of channels is horizontal.

10. The apparatus of claim 1, comprising more than one modular panel stacked vertically.

[11. A system for cleansing air and watering a plant comprising:

a modular panel having a rail, a plurality of channels, a fan connected to an air port, a water port connected to a water feed, wherein each channel of the plurality of channels has an opposing conical top and bottom; and a planting pot hung from the rail, the planting pot seated on a nozzle having a separate air chamber and a wick, wherein the fan connected to the air port provides an air flow behind the wick, wherein the air flow creates negative pressure within the nozzle and propels water from the water feed through the nozzle into the planting pot.]

[12. The system of claim 11, further comprising a pump directing the water feed into the water port and air entering the air port flows downward, preventing air and water from mixing in the nozzle.]

[13. The system of claim 11, further comprising interconnecting couplers and end caps configured to direct a flow of water from an upper channel to a lower channel.]

[14. The system of claim 13, wherein the lower channel includes a draining system.]

[15. The system of claim 13, wherein the nozzle is spaced 2-3 inches above a source of water and a base of the nozzle holding the wick is centered in the lower channel to prevent mixing of air and the source of water occurs.]

*16. A plant growing apparatus, comprising:*

*a body defining a channel, wherein:*

*the channel comprises a top portion and a bottom portion, and*

*the bottom portion of the channel is configured to store water;*

*a fan configured to introduce air into the top portion of the channel through an air port in communication with the channel;*

*a wick;*

*a planting pot; and*

*a nozzle comprising (i) a first end that extends into the channel, the first end further comprising a first opening and a second opening in which the wick is received, and (ii) a second end that extends into the planting pot, wherein:*

*a portion of the wick is configured to be submerged in the water, and*

*the first opening is configured to be placed at a distance from the water such that introduction of air into the top portion of the channel by the fan causes:*

*(i) a negative pressure build up in the nozzle,*

*(ii) air flow from the first end to the second end through the nozzle that further causes a volume of the water to be transported from the channel to the planting pot through at least the wick and the second opening, and*

*(iii) transport of a volume of water exclusively from the second opening to the second end from the negative pressure build up in the nozzle.*

*17. The apparatus of claim 16, wherein the nozzle is configured to be placed at a distance ranging from 2 to 3 inches above the water stored in the bottom portion of the channel.*

*18. The apparatus of claim 16, wherein:*

*the planting pot is configured to store soil rooting media; and*

*the nozzle comprises an air channel that is configured to direct a volume of air from the channel to the soil rooting media.*

*19. The apparatus of claim 18, wherein the transport of the volume of water from the channel through the nozzle irrigates a plant stored in the planting pot.*

*20. The apparatus of claim 16, wherein the fan is configured to introduce air into the top portion of the channel by flowing air in a downward direction from the top portion of the channel to the bottom portion of the channel.*

*21. A system for cleansing air and watering a plant, the system comprising:*

*a plurality of planting pots;*

*a panel having a body defining a channel that is configured to store water;*

*an air port in communication with the channel; and*

*a fan configured to deliver air into the channel through the air port;*

*wherein the panel comprises:*

*a plurality of wicks for which a portion is configured to be submerged in water,*

*a plurality of nozzles that each comprise (i) a first end that extends into a corresponding channel, the first end further comprising a first opening and a second opening in which a particular wick from among the plurality of wicks is received, and (ii) a second end that extends into the corresponding planting pot, wherein the first opening each nozzle is configured to be placed at a distance from the water; and*

*wherein introduction of air into the channel causes:*

*(i) a negative pressure build up in the plurality of nozzles,*

*(ii) air flow at least from the first end to the second end through the plurality of nozzles resulting from the negative pressure build up in each of the plurality of nozzles, and*

*(iii) transport of a volume of the water exclusively from the second opening of the plurality of nozzles to the second end of the plurality of nozzles resulting from the negative pressure build up in the plurality of nozzles.*

*22. The system of claim 21, further comprising:*

*a water port in communication with the panel and configured to introduce water into the channel.*

*23. The system of claim 22, further comprising:*

*a drain that is configured to remove a volume of water from the channel.*

*24. The system of claim 21, wherein each nozzle within the plurality of nozzles is configured to be placed at a distance ranging from 2 to 3 inches above the water.*

*25. The system of claim 21, wherein:*

*each planting pot included in the plurality of planting pots is configured to store soil rooting media; and*

*each nozzle included in the plurality of nozzles comprises an air channel that is configured to direct a volume of air from the channel to the soil rooting media.*

*26. The system of claim 25, wherein the transport of the volume of water from the channel through the plurality of nozzles irrigates a plurality of plants stored in the plurality of planting pots.*

*27. The system of claim 21, wherein the air port is configured to introduce air into the channel by flowing air in a downward direction from a top portion of the channel to a bottom portion of the channel.*

*28. A system comprising:*

*a modular panel having a rail, a plurality of channels, an air port and a water port, wherein each channel in the plurality of channels has a nozzle and a corresponding wick, wherein:*

*each nozzle comprises (i) a first end that extends into a particular channel from among the plurality of channels, the first end further comprising a first opening and a second opening in which a wick is received, and (ii) a second end that extends into the planting pot,*

*a portion of each wick is configured to be submerged in water stored in one of the plurality of channels, and*

*the first opening of each nozzle is configured to be placed at a distance from the water;*

*a connecting coupler and end cap configured to direct water flow from a first channel of the plurality of channels to a second channel of the plurality of channels, wherein the end cap restricts and holds water within a base of the first channel and directs water flow to a bottom of the second channel; and*

*a fan connected to the air port, wherein the fan provides an air flow into the first channel; and*

*wherein introduction of air into the first channel causes:*

*(i) a negative pressure build up in a particular nozzle in the first channel,*

*(ii) air flow at least from the first end to the second end of the particular nozzle through the particular nozzle resulting from the negative pressure build up in the particular nozzle, and*

*(iii) transport of a volume of the water exclusively from the second opening of the particular nozzle to the second end of the particular nozzle resulting from the negative pressure build up in the particular nozzle.*

* * * * *